Figure 1:
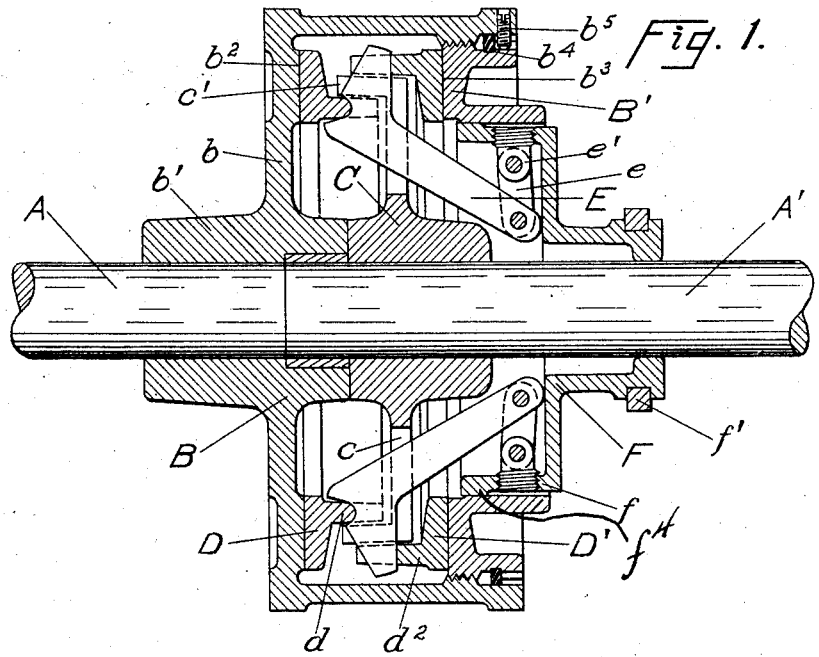

C. F. BLEDSOE.
FRICTION CLUTCH.
APPLICATION FILED JAN. 2, 1909.

970,459.

Patented Sept. 20, 1910.
2 SHEETS—SHEET 1.

Witnesses
Lawrence Reibstein
J. W. Angell

Inventor
Carl F. Bledsoe
by Charles W. Hills Atty

C. F. BLEDSOE.
FRICTION CLUTCH.
APPLICATION FILED JAN. 2, 1909.

970,459.

Patented Sept. 20, 1910.
2 SHEETS—SHEET 2.

WITNESSES
Lawrence Gilstein
J. W. Angell

INVENTOR
Carl F. Bledsoe
By Charles W. Tillo Atty.

THE NORRIS PETERS CO., WASHINGTON, D. C.

UNITED STATES PATENT OFFICE.

CARL F. BLEDSOE, OF CHICAGO, ILLINOIS.

FRICTION-CLUTCH.

970,459.  Specification of Letters Patent.  Patented Sept. 20, 1910.

Application filed January 2, 1909.   Serial No. 470,381.

*To all whom it may concern:*

Be it known that I, CARL F. BLEDSOE, a citizen of the United States, and a resident of the city of Chicago, in the county of Cook and State of Illinois, have invented certain new and useful Improvements in Friction-Clutches; and I do hereby declare that the following is a full, clear, and exact description of the same, reference being had to the accompanying drawings, and to the letters of reference marked thereon, which form a part of this specification.

This invention relates to that class of friction clutches in which a plurality of internal friction members are adapted to be brought in frictional bearing as the clutch engages. Heretofore in many devices of the kind, although a plurality of friction elements were brought simultaneously into engagement, the operator has found the clutch exceedingly difficult to adjust, and furthermore, owing frequently to numerous small parts and complicated constructions, manufacture has been expensive and repair occasioned by breakage has proven difficult and expensive.

The object of this invention is to provide a friction clutch capable of the utmost nicety of adjustment to afford any frictional resistance within the capacity of the clutch, and also to afford a construction in which there are but few moving or operating elements, and these acting positively to rigidly clamp or engage the frictional element or elements in engagement with the complemental element adapted to be engaged thereby.

It is also an object of the invention to afford a mechanism of the class described in which assembling and adjusting is easily accomplished even though the parts be not exactly in alinement.

It is a further object of the invention to afford a dust proof clutch adapted for all the various uses of such a device as, for instance, automobile propulsion, for shop, factory and mill use, and for any of the purposes in which an effective and powerful gear may be required to transmit motion to a shaft previously at rest to drive the same.

It is the object of this invention wherever a device of the class may be required to afford a construction which, although positively gripping when in full frictional engagement, yet in which sufficient slippage is permitted during the engaging of the clutch to insure the overcoming of the inertia of a body to be driven without serious or excessive strain on the clutch.

The invention embraces many novel features and consists of the matters hereinafter described and more fully pointed out and defined in the appended claims.

Figure 2:
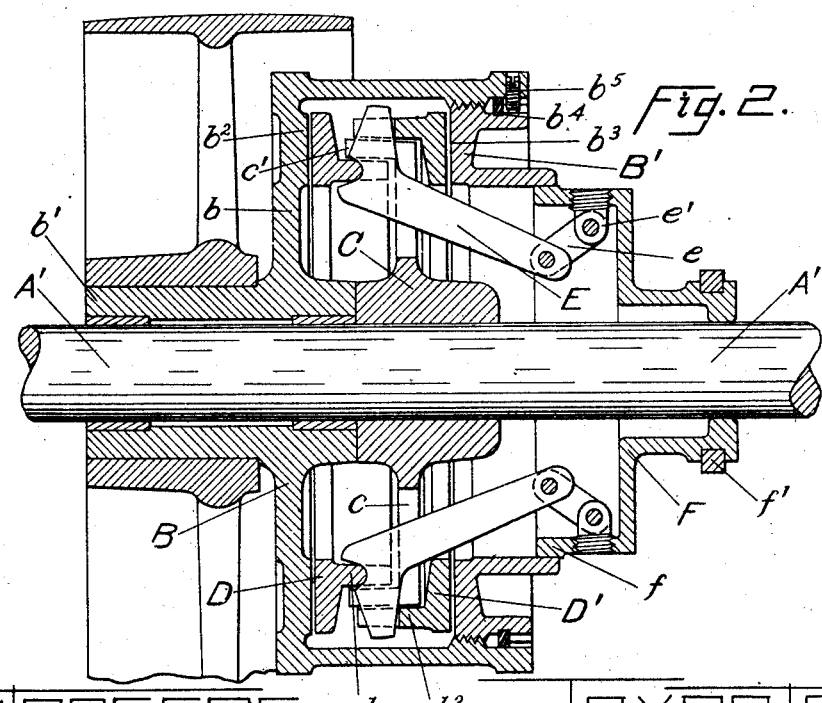
Figure 3:
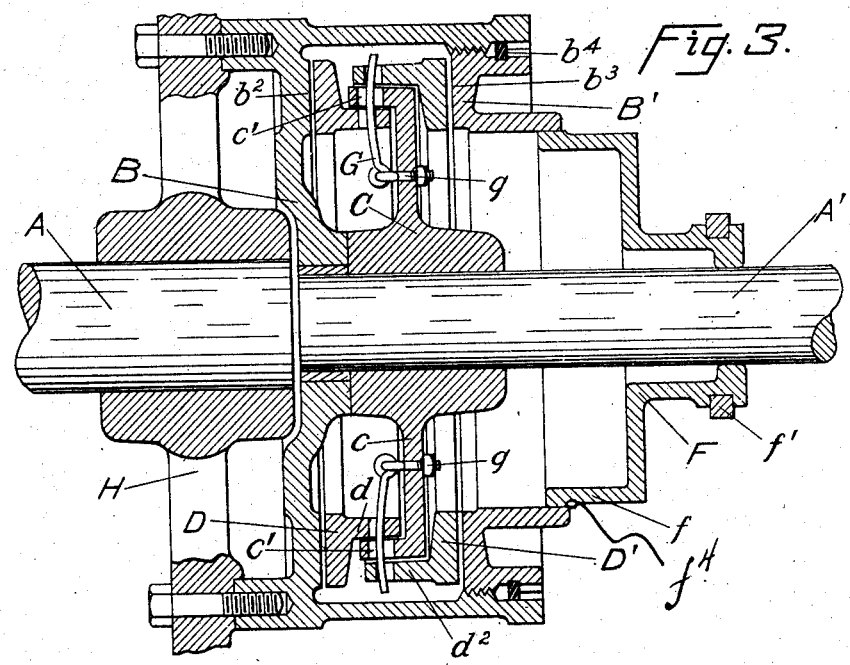
Figure 4:
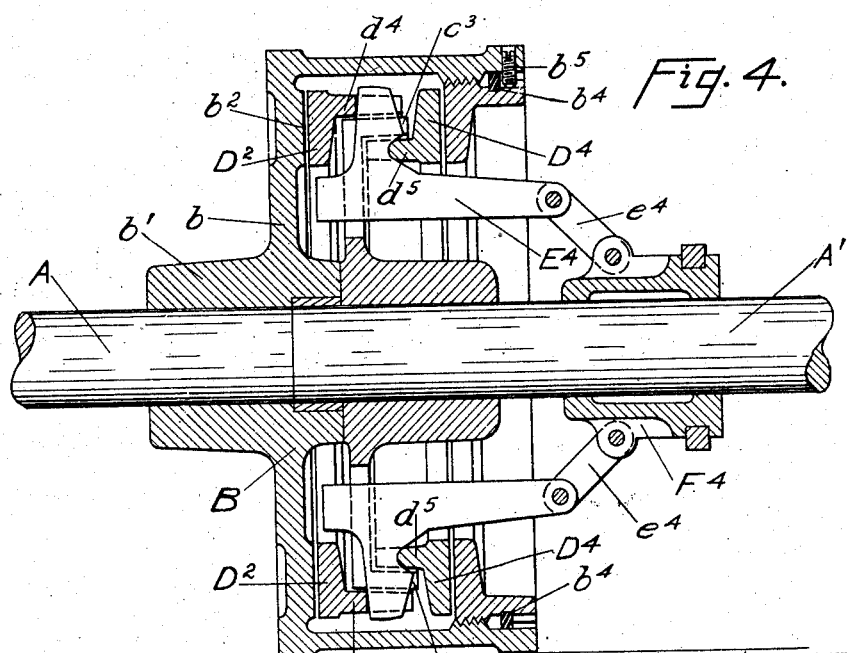

In the drawings: Figure 1 is a central section taken longitudinally of the shaft and showing the clutch members engaged. Fig. 2 is a similar view showing the clutch members disengaged, also showing a pulley or belt wheel secured to the hub of the clutch drum. Fig. 3 is a longitudinal section taken at a right angle with the plane of the section shown in Figs. 1 and 2, illustrating the engagement of the spring, and also illustrating a method of attachment convenient for automobile transmission purposes. Fig. 4 is a view similar to Fig. 1, and illustrates a slightly modified construction in which the engagement of the clutch members is accomplished by throwing the outer ends of the clamping levers radially outward instead of inwardly.

As shown in the drawings: A, indicates a driving shaft having secured thereon a clutch drum B, the web $b$, of which is integrally united with the hub $b'$, as shown in Fig. 1. Within said drum is provided a friction face $b^2$, near the periphery of the web of the drum, and as shown, said drum is internally threaded slightly within its open end to receive therein the adjusting ring member B', which, on its inner side opposite the face $b^2$, is provided with a flat friction face $b^3$.

Between the outer periphery of the ring member B', and the outer edge of the clutch drum, is provided a recess in which is placed a rubber or rawhide packing $b^4$, and as shown, said ring is firmly held in place from rotation by set screws $b^5$, which extend through the periphery of the drum and into suitable recesses in said ring.

Extending into the drum and in alinement with, and bearing against the shaft A, is a shaft A', and rigidly secured thereon is the hub C, having integrally engaged thereon a web $c$, which extends outwardly to near the inner periphery of the drum and is provided with a flange $c'$, directed toward the web of the drum. Loosely seated within the flange $c'$, of said driving web or disk $c$, is a peripheral flange $d$, of a friction ring D, faced on its outer side to bear against the friction face $b^2$, on the web of the drum, and as shown, having its flange $d$, notched at a plurality of points. Also adapted to bear against the flat face $b^3$, of the adjusting ring B′, is a friction ring D′, provided, as shown, with a peripheral flange $d^2$, directed toward the friction ring D, and on the outer side of the flange $c'$, of the driving member. As shown, levers E, extend through suitable slots in the driving disk or member $c$, and through suitable notches or apertures in the flange $d$, of the friction ring D, and the flange $d^2$, of the friction ring D′, as shown in Figs. 1 and 2, and the arms or levers thereof extend inwardly and toward the open end of the drum and are there pivotally engaged on the links $e$, the opposite ends of which are pivotally engaged on set screws $e'$, which, as shown, are threaded on the flange $f$, of the inwardly flanged collar F, slidable on the shaft A′. As shown, the hub of said collar is provided with a shifting ring $f'$, adapted to be engaged by any suitable shifting lever to force said flanged collar inwardly, as shown in Fig. 1, to actuate the clutch or to release the same, as shown in Fig. 2.

As shown in Fig. 3, strong spring rods G, are pivotally connected at their inner ends by eye bolts $g$, with the web $c$, of the driving disk C, and extends radially outward through relatively small apertures in the flange $d$, of the inner friction ring, in the flange $c$, and a corresponding aperture in the flange $d^2$, of the outer friction ring. As shown, two of said springs are used, though, of course, a greater number may be employed if desired. The action of said springs is to draw the friction rings positively away from the bearing faces on the web of the drum and on the adjusting ring B′, as shown in Figs. 2 and 3.

In the construction shown in Fig. 3, a pulley such, for instance, as a balance wheel H, is provided on the end of the main engine shaft A, and the clutch drum is rigidly bolted to the spider of the balance wheel in a somewhat familiar manner. The shaft A′, extending into alinement with the shaft A, is positively held at all times in alinement by the inwardly turned portion of the hub of the clutch drum. Otherwise the construction is as before described.

In the construction shown in Fig. 4, the inner friction ring $D^2$, is provided with a peripheral flange $d^4$, which extends outside of the flange $c^3$, of the driving disk, and the friction ring $D^4$, is provided with a peripheral flange $d^5$, which fits loosely within the flange of the driving member. In this construction the toe of the lever $E^4$, extends through the slot or aperture in the driving disk and into engagement with the flange on the outer friction member $D^2$, while the angular portion of the lever is notched to engage in a notch in the flange $d^5$, of the inner friction ring. In this construction the link $e^4$, is engaged directly upon the sliding hub $F^4$, and the levers are actuated by forcing the sliding member inwardly, thus by means of the links forcing the outer ends of the levers $E^4$, outwardly and producing a corresponding outward adjustment of the friction rings.

The operation is as follows: Referring to Figs. 1 to 3 inclusive, when it is desired to engage the clutch the sliding clutch member or collar is forced inwardly carrying the outer ends of the links $e$, inwardly, and in consequence forcing the outer ends of the levers E, toward the shaft. This, of course, forces the toe of the lever E, oppositely from the heel or bend thereof, which is fulcrumed on the flange $d$, of the movable ring D, and in consequence, the friction rings D—D′, are forced with great pressure against the bearing faces $b^2$—$b^3$, this bearing pressure continuing until it is desired to release the clutch. This may be done instantly by means of any suitable lever for retracting the sliding collar or hub F, the retraction being assisted by the action of the springs G, these bearing outwardly on the flange of the friction ring D, and inwardly on the flange of the friction ring D′, serve to instantly draw said rings toward the driving disk $c$, when the levers are shifted causing complete detachment of all the driving elements from the clutch drum and permitting the clutch drum to rotate freely without driving the shaft A′.

It is obvious that the operation is the same whether the bent levers are forced inwardly or outwardly in actuating the clutch. Conveniently, however, the construction shown in Figs. 1 to 3 inclusive, affords great advantages, owing to the facility of adjustment. Should it be desired to adjust the adjusting ring B′, inwardly to afford a better engagement between the friction rings D—D′, the set screws $b^5$, are removed and the bearing ring turned inwardly using any suitable tool for this purpose until a suitable contact is secured, after which the set screws are returned to hold the parts permanently in adjustment. Likewise, should it be desired to vary the throw of the levers to insure each exerting the same pressure on the rings, this may be accomplished by releasing the links from the set screws whereby the same are engaged to the flange of the collar F, and having suitably adjusted the screws again securing the links thereto, very slight adjustment of the set screw is sufficient to afford considerable variation in the throw of the lever in actuating the friction rings.

The flange $f$, as shown, is provided with a peripheral bead which fits within the flange $b^6$, of the follower ring B′. This affords such flexibility of the structure as to permit assembling and satisfactory operation although the shafts be somewhat out of alinement. The construction of the clutch also insures satisfactory operation even though considerable variation from alinement exists from whatsoever cause for it is evident the rings D—D', are self adjusting to the bearing faces in the drum and on the follower ring and readily compensate for any wabble due to imperfect alinement. It is also to be noted that, inasmuch as there are no bosses or lugs on the parts, the construction is thereby greatly cheapened and simplified.

Of course, while I have shown the device in various frictional arrangements, it is quite obvious that the device may be fastened upon the shaft or in any suitable manner to permit power to be transmitted to either the clutch, cylinder or drum, or mechanism within the same. I therefore do not purpose limiting this application for patent otherwise than necessitated by the prior art, as numerous details of construction and arrangement may be varied without departing from the principles of this invention.

I claim as my invention:

1. A friction clutch embracing a hollow drum adapted to be engaged to one shaft section, a driving member engaged to another shaft, an adjusting ring adjustably engaged in the drum, oppositely movable friction rings within the drum, externally operated, independently adjustable levers for forcing said friction rings into engagement with the bearing faces within the drum and adjusting ring, and a spring engaging each of the friction rings to retract the same from engagement.

2. A friction clutch embracing a hollow drum adapted to be engaged to one shaft section, a driving member engaged to another shaft, substantially in alinement therewith, an adjusting ring adjustably engaged in the drum, oppositely movable bearing rings within the drum, externally operated levers fulcrumed on one of the bearing rings adapted to force said bearing rings into engagement with the bearing faces within the drum and the adjusting ring, and a spring engaging each of the bearing rings to retract the same from engagement.

3. A friction clutch embracing a hollow drum having a bearing face adapted to be engaged to one shaft section, a slotted driving member engaged to another shaft substantially in alinement with the first shaft, an adjusting ring adjustably engaged in the drum and provided with a bearing face, means rigidly engaging the same in adjusted position, oppositely movable bearing rings within the drum, externally operated levers carried in the slots of the driving member and acting to force said bearing rings into engagement with the bearing faces within the drum and adjusting ring, and a spring engaging each of the bearing rings to retract the same from engagement, and means simultaneously actuating the levers.

4. In a device of the class described independently adjustable engaging levers, means for simultaneously actuating the same, oppositely disposed friction rings, having laterally directed flanges notched in alinement, the flange of one ring receiving the levers in the notches affording a fulcrum for the levers, and the notches in the flange in the other ring receiving the ends of the levers therein.

5. In a friction clutch, friction elements, friction rings loosely supported between the friction elements, laterally directed concentric flanges integral with the friction rings and notched and levers engaging in the notches in one flange and recessed to engage the flange and said levers having extensions engaging in the notches in the flange of the other ring.

6. In a friction clutch movable friction elements, levers fulcrumed on one of said movable elements and having the ends directed to bear against the other movable friction element, stationary friction members against which the friction elements are adapted to bear, and means bearing against both of the movable friction elements for retracting the same from the friction members.

7. The combination with two alined shafts of a hollow drum rigidly secured on one of the same, an adjusting ring threaded in the open end thereof and affording together with the web of the drum opposed friction faces, a driving member secured on the other shaft, friction rings loosely secured within the drum on each side the driving member, levers fulcrumed on one and bearing against the other of said friction rings, externally operated means for actuating said levers to force said rings oppositely into operative engagement with the opposed friction faces, and one or more springs acting on the driving member and friction rings to release said friction rings when pressure on said levers is released.

8. The combination with a driving shaft and an alined driven shaft of a hollow drum on the driving shaft, an adjusting ring threaded in the open end thereof and affording together with the web of the drum opposed flat friction faces, a driving member rigidly secured on the driven shaft, flanged friction rings loosely secured within the drum on each side the driving member, levers extending through the driving member and fulcrumed on one of the friction rings, and bearing against the other of said friction rings, a sliding collar on the driven shaft, links adjustably secured thereto and pivotally engaging said levers, means for shifting said collar to force said rings oppositely into operative engagement, and one or more springs carried on the driving member and engaging the flanges of the friction rings and acting to release said rings when pressure on said levers is released.

9. The combination with substantially alined driving and driven shafts, of a hollow drum on the driven shaft having a flat inner face, an adjusting ring threaded in the open end thereof and having a flat inner face and affording a peripheral outer channel between the same, and the drum, a packing strip thereon, a flanged driving member on the driven shaft, friction rings loosely secured within the drum on each side the driving member, levers carried loosely by the driving member and bearing oppositely in notches in the friction rings to shift the same oppositely into engagement with the friction faces of the drum and adjusting ring, externally operated independently adjustable means for actuating said levers and thereby the friction rings oppositely into engagement, and springs secured to the driving member and extending through the rim of the friction rings and acting to shift the rings inwardly to the driving member when pressure on said levers is released.

10. A clutch of the class described embracing a hollow drum secured to the driving shaft, an adjusting ring threaded in the open end thereof and affording together with the head of the drum opposed friction faces, a peripherally flanged driving disk rigidly secured on the driven shaft and centrally located in and projecting to near the inner periphery of the drum, friction rings, one on each side the driving disk, a flange on each ring, one engaging within and the other without the flange of the driving disk, a plurality of levers extending through slots in the driving disk and bearing in notches in the flanges of the friction rings, a sliding collar on said driven shaft adjustably connected with the ends of the levers and acting by adjustment of the collar to actuate said levers, and springs engaged to the driving disk and extending loosely through apertures in the flange thereof and in the flanges of the friction rings.

11. In a friction clutch the combination with a drum of an adjusting ring threaded into the open end thereof and affording a peripheral channel between it and said drum, a dust resisting ring in said channel, set screws for retaining the same in place and locking the adjusting ring in adjusted position, oppositely movable friction rings within the drum adapted to bear on the friction faces on the adjusting ring and on the web of the drum, a driving member in the drum rigidly secured to the driven shaft and slotted radially, levers extending through the slots in said driving member and oppositely engaging the friction rings to force them into engagement with the faces opposed thereto, means for actuating the levers, and radial springs on the driving member and engaging both friction rings to release the same when pressure on the levers is reduced.

12. In a clutch of the class described a hollow drum on a driving shaft, a flanged adjusting ring adjustably engaged in the open end thereof, frictional elements in said drum, levers for actuating the same, a sliding collar on the driven shaft, adjustable means connecting the same with the levers, a flange on the collar, a raised bead on said flange fitting closely in the flange of the adjusting ring and a raised bead in the bore of the collar bearing against the driven shaft.

13. A clutch comprising a friction member, a friction member adjustably secured thereto, a plurality of friction rings loosely supported between said friction members and levers having their corresponding ends extending between the friction rings adapted to force both rings oppositely against the friction members and a flange integral with one of the rings on which all the levers are fulcrumed.

14. A clutch comprising a friction member, a friction member adjustably secured thereto, a plurality of friction rings loosely supported between said friction members, levers having their ends projecting between the rings adapted to force both rings oppositely against the friction members and a member between the friction rings slotted to receive the ends of the levers therethrough adapted to couple the levers to both of said friction rings.

15. In a clutch a driving and a driven shaft, friction members supported on the driving shaft, oppositely movable friction members on the driven shaft positioned therebetween and levers projecting at corresponding ends between the oppositely movable friction members adapted to expand the same to engage the friction members on the driven shaft and a peripheral member on one of the movable friction members adapted to afford a movable fulcrum for all of the levers.

16. In a clutch a driving and a driven shaft, friction members supported on the driving shaft, oppositely movable friction members on the driven shaft positioned therebetween, levers fulcrumed on one of the oppositely movable friction members adapted to expand the same to engage the friction members on the driven shaft, a member rigidly secured on the driven shaft between the friction members thereon through which the levers extend and means secured thereto for simultaneously retracting both of the oppositely movable friction members.

17. A clutch embracing a drum having a friction face, a member adjustably secured thereto having a friction face, a slotted member between the friction faces, a friction member on each side of the slotted member adapted to engage the aforesaid friction faces and levers extending through the slots in said member and shaped at their inner ends to force the friction members oppositely to engage the friction faces.

18. A clutch embracing a drum having a friction face, a member adjustably secured thereto having a friction face, a slotted member between the friction faces, a friction member on each side of the slotted member adapted to engage the aforesaid friction faces, levers extending through the slots in said member and shaped at their inner ends to force the friction members oppositely to engage the friction faces, means for independently adjusting each lever to vary the throw thereof and springs engaging the friction members to retract the same.

19. In a clutch adjustably connected friction elements, friction members secured therebetween, notched flanges secured to the friction members, levers fulcrumed at one end to one of the flanges and extending into the notches and means for oscillating the levers to force the friction members into engagement with the friction elements.

20. In a clutch adjustably connected friction elements, friction members secured therebetween, levers fulcrumed at one end to one of the friction members, means for oscillating the levers to force the friction members into engagement with the friction elements, and springs pivotally supported to engage both friction members to retract the same from the friction elements when the levers are released.

21. In a clutch a driving and a driven shaft, a drum on the driving shaft having a friction face, a friction element secured to the drum, a driving member on the driven shaft having a peripheral flange, friction members on each side of the driving member having peripheral flanges overlapping the flange on the driving member and levers extending at one end in slots in the driving member and notches in the flanges of the friction members said levers adapted to force the friction members oppositely to engage the friction face on the drum and the friction element respectively.

22. In a clutch a driving and a driven shaft, a drum on the driving shaft having a friction face, a friction element secured to the drum, a driving member on the driven shaft having a peripheral flange, friction members on each side of the driving member having peripheral flanges overlapping the flange on the driving member, levers extending at one end in slots in the driving member and into notches in the flanges of the friction members adapted to force the friction members oppositely to engage the friction face on the drum and the friction element respectively, and leaf springs pivoted to the driving member and extending through the flanges of the friction members for adjusting the friction members in one direction.

In testimony whereof I have hereunto subscribed my name in the presence of two subscribing witnesses.

CARL F. BLEDSOE.

Witnesses:
C. W. HILLS,
LAWRENCE REIBSTEIN.